Feb. 22, 1938. B. B. GEYER Re. 20,656

REFRIGERATING APPARATUS

Original Filed July 17, 1930 2 Sheets-Sheet

INVENTOR
Bertram B. Geyer
BY
Spencer, Hardman & Fehr
ATTORNEYS

Feb. 22, 1938. B. B. GEYER Re. 20,656

REFRIGERATING APPARATUS

Original Filed July 17, 1930 2 Sheets-Sheet 2

INVENTOR
Bertram B. Geyer
BY
Spencer, Hardman & Fehr
ATTORNEYS

Reissued Feb. 22, 1938 Re. 20,656

UNITED STATES PATENT OFFICE 20,656

REFRIGERATING APPARATUS

Bertram B. Geyer, Dayton, Ohio, assignor, by mesne assignments, to General Motors Corporation, a corporation of Delaware Original No. 1,940,680, dated December 26, 1933, Serial No. 468,604, July 17, 1930, Renewed May 15, 1933. Application for reissue December 20, 1935, Serial No. 55,491

30 Claims. (Cl. 62—108.5)

This invention relates to refrigerating apparatus and more particularly to the type of apparatus adapted for household use having means for freezing or congealing the so-called ice cubes.

One of the objects of the present invention is to provide improved means and method for releasing the so-called ice cubes from the trays or molds in which they are frozen.

More specifically it is an object of the invention to provide for releasing the frozen liquid from the mold or tray in which it has been frozen by moving the walls of the molds or the grid in the tray, forcing the frozen liquid out of the mold or tray, and utilizing the movement to break the bond between the frozen liquid and the mold or tray.

Further objects and advantages of the present invention will be apparent from the following description, reference being had to the accompanying drawings, wherein a preferred form of the present invention is clearly shown.

Figure 1:
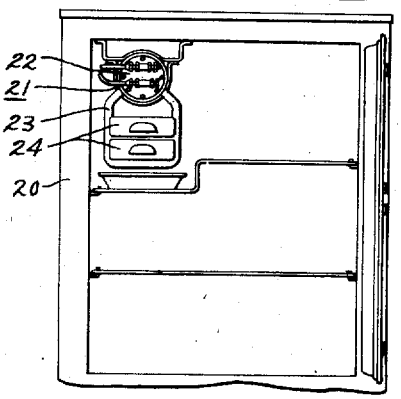
Fig. 1 is a front view of a refrigerator with the door open showing a cooling unit containing trays for freezing ice cubes.

In Fig. 1 is shown a refrigerator 20 having an evaporator or cooling unit 21 comprising a header 22, and a plurality of ducts or coils 23 depending therefrom, and having a plurality of trays or molds 24 supported within the depending ducts or coils for the purpose of freezing ice cubes. The cooling unit 21 is supplied with liquid refrigerant which absorbs heat from the refrigerator and from the liquid in the ice trays and thus causes freezing by cooling the liquid in the trays below its freezing temperature.

Figure 2:
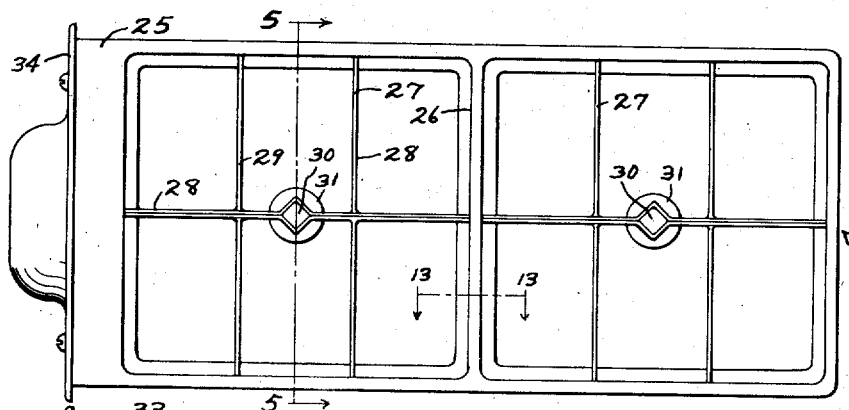
Fig. 2 is a top view of a preferred form of ice tray showing applicant's invention.
Figure 5:
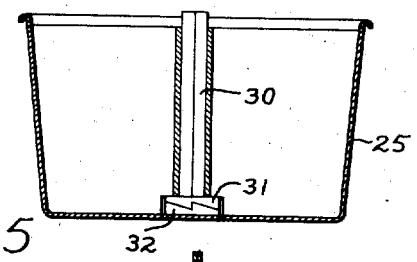
Fig. 5 is a cross-sectional view along the line 5—5 of Fig. 2.
Figure 6:
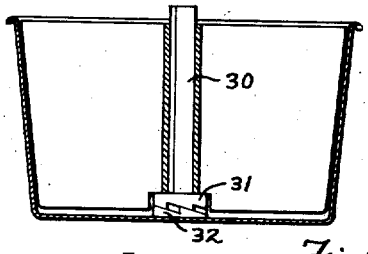
Fig. 6 is a cross-sectional view similar to Fig. 5 showing the cam rotated as eighth turn.
Figure 7:
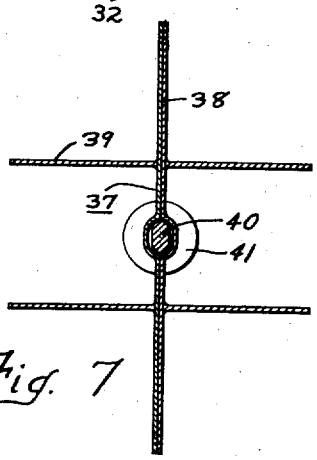
Fig. 7 is a horizontal cross-sectional view of a portion of Fig. 3 showing one of the grids.
Figure 8:
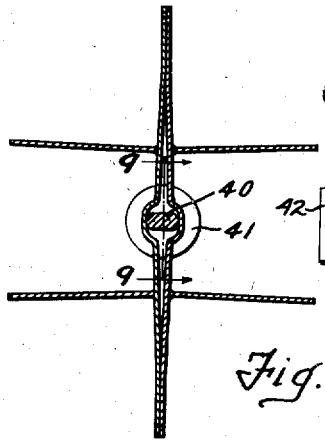
Fig. 8 is a cross-sectional view similar to Fig. 7 showing the grid flexed.
Figure 9:
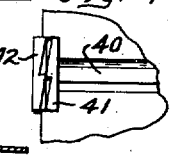
Fig. 9 is a fragmentary sectional view on the line 9—9 of Fig. 8 showing the position of the lower cams.
Figure 13:
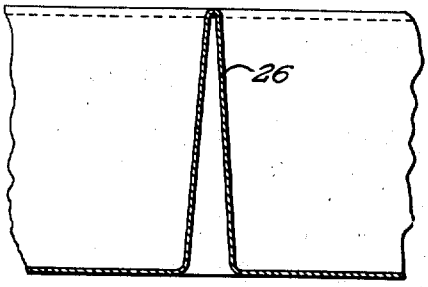
Fig. 13 is a cross-sectional view on the line 13—13 of Fig. 2.

One of the preferred forms of ice trays 25 is shown in Fig. 2 having a transverse rib 26 (Figs. 2 and 13) dividing the tray into front and rear portions, each containing a grid member 27 which divides each portion of the tray into a plurality of ice cube molds. Each grid 27 is made into two halves each having a longitudinal member 28 with a plurality of transverse partitions 29 extending at right angles to the longitudinal member 28. The two halves have their longitudinal members placed side by side and their ends riveted together forming the central longitudinal partition of the grid structure, with the plurality of transverse partitions intersecting the central longitudinal partition on either side at right angles. In the center of the longitudinal partition of the grid member is positioned a square cam member 30 (Figs. 5 and 6) extending vertically between the two halves and having a cam member 31 fixed at its lower end which coacts with a cam member 32 which is fixed to the bottom of the tray 25. The ice blocks are loosened by moving one of the vertical walls of the mold. By engaging the upper end of the vertical cam member 30 with a key and rotating it to the position shown in Fig. 6, the grid 27 will be flexed by the spreading apart of the two halves at their center by the cam 30 while at the same time the grid member will be raised a short distance from the bottom of the tray.

Figure 3:
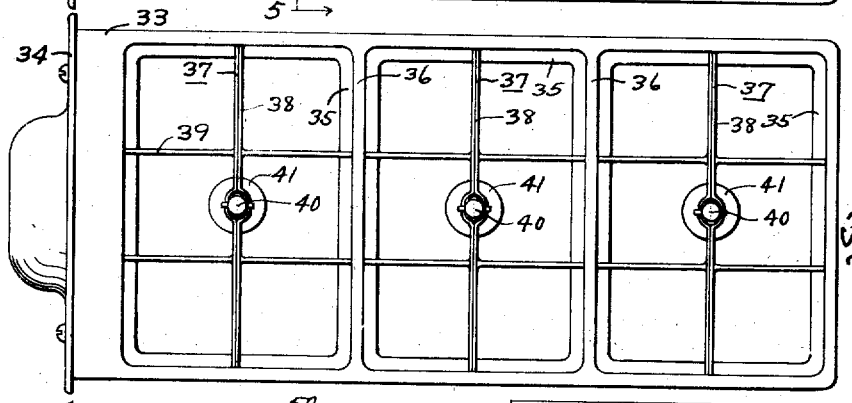
Fig. 3 shows another preferred form of ice tray embodying applicant's invention.

The tray 33 is divided into three compartments by the hollow ribs 36 (shown in Fig. 3) and has a conventional tray front 34 fastened to its front end. Each compartment contains a grid member 37 having a split central longitudinal partition 38 similar to that shown in Fig. 2 and a plurality of transverse partitions 39 connected to, and intersecting the longitudinal partition 38 at right angles. The split longitudinal partition is made of two strips of sheet metal which are riveted together at the ends and has, in a central recess between the two strips, a vertical cam 40, oval-shaped in cross-section (Figs. 3, 7, 8 and 9), having a disk-shaped cam 41 fixed at its lower end for coacting with a stationary cam 42 which is similar to cam 32, shown in Figs. 5 and 6. When the vertical cam 40 is turned a quarter of a turn, the grid member 37, together with the cams 40 and 41, is gradually raised a short distance upwardly from the tray by the co-action of cams 41 and 42 and by this same turning of the cam 40 the split longitudinal partition of the grid is spread apart and flexed by the vertical cam 40.

Figure 4:
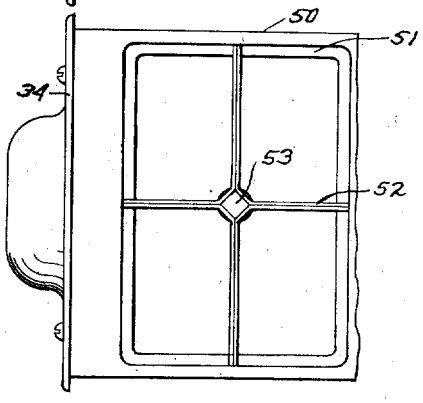
Fig. 4 is a portion of an ice tray incorporating a modified form of applicant's invention.
Figure 10:
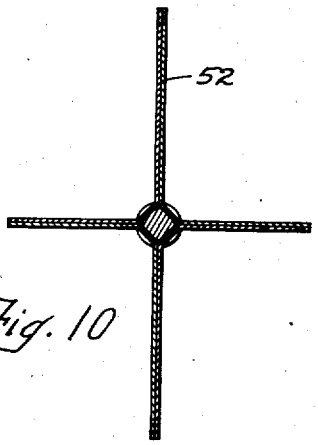
Fig. 10 is a horizontal cross-sectional view of the grid shown in Fig. 4.
Figure 11:
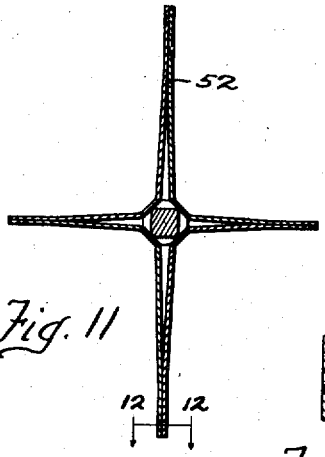
Fig. 11 is a horizontal cross-sectional view similar to Fig. 10 showing the grid member flexed.
Figure 12:
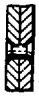
Fig. 12 shows a fragmentary cross-sectional view on the line 12—12 of Fig. 11.

In Fig. 4 is shown another embodiment of applicant's invention showing a portion of a tray 50 including a compartment 51 having tapered sides. This compartment is divided into four ice cube molds by the cruciform grid member 52 (see Figs. 10 and 11) having a square vertical cam 53 enclosed in the recess at the intersection of the arms. It is made up of four L-shaped sheet metal portions having their legs assembled together back to back in the form of a cross and having the ends of the adjacent legs riveted together as shown in Fig. 12. The corners formed at the center of the grid are beveled and provide a square-shaped hollow center for receiving the square cam 53.

When a key is applied to the end of the vertical cam member 53 and rotated one-eighth of a revolution, the grid member is spread apart and flexed along the center lines of the partitions and the ice cubes frozen in the molds are pushed against the tapered sides of the compartment and force the grid and the ice cubes upward and out of the compartment and at the same time the bond between the ice cubes and the grid is broken by the flexing of the grid, thereby permitting the ice cubes to be removed without the application of heat in any form.

From the above description it will be seen that applicant has provided manual means whereby the ice cubes after being frozen within the molds of an ice tray may be released from the grid and tray by spreading the grid and raising the grid from the tray.

While the several forms of embodiment of the invention as herein disclosed, constitute a preferred form, it is to be understood that other forms might be adopted, all coming within the scope of the claims which follow.

What is claimed is as follows:

1. In freezing apparatus for liquids, the combination of a tray for making ice cubes, a grid within said tray adapted to form a plurality of ice cube molds, and cam means for expanding said grid and for raising the grid from the tray.

2. In freezing apparatus for liquids, the combination of a tray for making ice cubes, a split grid within said tray adapted to form a plurality of ice cube molds, and cam means for simultaneously expanding the split grid and raising the grid from the tray.

3. In freezing apparatus for liquids, the combination of a tray for making ice cubes, a split partition within the tray adapted to form a plurality of ice cube molds, and means for simultaneously raising the partition from the tray and for spreading apart the split partition so as to release the cubes therefrom.

4. In a freezing apparatus, the combination of a tray adapted to receive a substance to be frozen, a grid within said tray adapted to divide the tray into a plurality of molds, said grid being of cruciform shape and including vertically extending walls, each wall of said cruciform shaped grid comprising two sheet metal members normally disposed in contact with one another, and means for simultaneously moving at least a portion of one of said sheet metal members relative to the other of said sheet metal members of each wall to expand the walls and separate the frozen substance from the grid.

5. In a freezing apparatus, the combination of a tray adapted to receive a substance to be frozen, a grid within said tray adapted to divide the tray into a plurality of molds, said grid being of cruciform shape and including vertically extending walls, each wall of said cruciform shaped grid comprising two sheet metal members normally disposed in contact with one another, and means for moving at least a portion of one of said sheet metal members relative to the other of said sheet metal members of each wall to simultaneously expand the walls of the grid and to raise the grid from the tray.

6. In a freezing apparatus, the combination of a tray adapted to receive a substance to be frozen, a grid within said tray adapted to divide the tray into a plurality of molds, said grid being of cruciform shape and including vertically extending walls, each wall of said cruciform shaped grid comprising two sheet metal members normally disposed in contact with one another, and cam means for simultaneously moving at least a portion of both of said sheet metal members of each wall relative to one another to expand the walls and separate the frozen substance from the grid.

7. In a freezing apparatus, the combination of a tray adapted to receive a substance to be frozen, a grid within said tray adapted to divide the tray into a plurality of molds, said grid being of cruciform shape and including vertically extending walls, each wall of said cruciform shaped grid comprising two sheet metal members normally disposed in contact with one another, and cam means for moving at least a portion of both of said sheet metal members of each wall relative to one another to simultaneously expand the walls of the grid and to raise the grid from the tray.

8. In a freezing apparatus, the combination of a tray adapted to receive a substance to be frozen, a grid within said tray adapted to divide the tray into a plurality of molds, said grid being of cruciform shape and including vertically extending sheet metal walls of double thickness, the sheet metal member forming one side of one wall being extended to form one side of an adjacent wall, the sheet metal member forming the opposite side of said one wall also being extended to form one side of a second adjacent wall, said sheet metal members of each wall being normally in contact with one another, and means for simultaneously moving the sides of each wall relative to one another to expand the walls and separate the frozen substance from the grid.

9. In a freezing apparatus, the combination of a tray adapted to receive a substance to be frozen, a grid within said tray adapted to divide the tray into a plurality of molds, said grid being of cruciform shape and including vertically extending sheet metal walls of double thickness, the sheet metal member forming one side of one wall being extended to form one side of an adjacent wall, the sheet metal member forming the opposite side of said one wall also being extended to form one side of a second adjacent wall, said sheet metal members of each wall being normally in contact with one another, and means for moving the sides of each wall relative to one another to simultaneously expand the walls of the grid and to raise the grid from the tray.

10. In a freezing apparatus, the combination of a tray adapted to receive a substance to be frozen, a grid within said tray adapted to divide the tray into a plurality of molds, said grid being of cruciform shape and including vertically extending sheet metal walls of double thickness, the sheet metal member forming one side of one wall being extended to form one side of an adjacent wall, the sheet metal member forming the opposite side of said one wall also being extended to form one side of a second adjacent wall, said sheet metal members of each wall being normally in contact with one another, and a manually actuated cam extending between the sheet metal members at the intersection of the walls of the cruciform shaped grid for simultaneously moving the sides of each wall relative to one another to expand the walls and separate the frozen substance from the grid.

11. In a freezing apparatus, the combination of a tray adapted to receive a substance to be frozen, a grid within said tray adapted to divide the tray into a plurality of molds, said grid being of cruciform shape and including vertically extending sheet metal walls of double thickness, the sheet metal member forming one side of one wall being extended to form one side of an adjacent wall, the sheet metal member forming the opposite side of said one wall also being extended to form one side of a second adjacent wall, said sheet metal members of each wall being normally in contact with one another, and a manually actuated cam extending between the sheet metal members at the intersection of the walls of the cruciform shaped grid for moving the sides of each wall relative to one another to simultaneously expand the walls of the grid and to raise the grid from the tray.

12. In a freezing apparatus, the combination of a tray adapted to receive a substance to be frozen, a split grid within said tray adapted to divide the tray into a plurality of molds, cam means for expanding said split grid to separate the frozen substance from the grid, and a second cam movable simultaneously with said first named cam for raising the grid from the tray.

13. In refrigerating apparatus, the combination of a tray for freezing a substance into molds, a double walled grid within said tray adapted to form a plurality of molds, both walls of said double walled grid being movable relative to one another, and cam means for expanding the walls outwardly from one another and for simultaneously raising the grid relative to the tray.

14. In refrigerating apparatus, the combination of a tray for freezing a substance into molds, a double walled grid within said tray adapted to form a plurality of molds, both walls of said double walled grid being secured together at least at one of their ends and being movable relative to one another at a point remote from the secured ends thereof, and cam means for expanding the movable portions of the walls outwardly from one another and for simultaneously raising the grid relative to the tray.

15. In refrigerating apparatus, the combination of a tray for freezing a substance into molds, a double walled grid within said tray adapted to form a plurality of molds, each wall of said double walled grid being secured together at both ends thereof and being movable relative to one another between their ends, and cam means for expanding the walls outwardly from one another between their ends and for simultaneously raising the grid relative to the tray.

16. In refrigerating apparatus, the combination of a tray for freezing a substance into molds, a double walled grid within said tray adapted to form a plurality of molds, at least one wall of said double walled grid being movable horizontally relative to the other wall thereof, and cam means for expanding the movable wall outwardly relative to its corresponding wall and for simultaneously raising both walls of said double walled grid relative to the tray.

17. In freezing apparatus for liquids, the combination of a tray for making ice cubes, a grid within said tray adapted to form a plurality of ice cube molds, and cam means within the tray for raising the grid from the tray.

18. In a freezing apparatus, the combination of a tray adapted to receive a substance to be frozen, a split grid within said tray adapted to divide the tray into a plurality of molds, said split grid including a first portion movable relative to a second portion thereof, and means for moving one of said grid portions relative to the other and for moving at least a portion of said grid upwardly relative to said tray to separate the frozen substance from the grid and the tray.

19. In a freezing apparatus, the combination of a tray adapted to receive a substance to be frozen, a split grid within said tray adapted to divide the tray into a plurality of molds, said split grid including a first portion movable relative to a second portion thereof, means operable between said grid and said tray for moving the grid upwardly relative to the tray to separate the frozen substance from the tray, said means being so constructed and arranged as to cause movement of one of said grid portions relative to the other portion thereof to also separate the frozen substance from at least a portion of said grid.

20. In a freezing apparatus of the type including a pan adapted to receive a substance to be frozen and a grid within the pan for dividing the interior thereof into a plurality of ice block molds, the method of releasing frozen blocks from the pan which consists in, moving the grid toward a side wall of said pan to substantially compress the blocks between the grid and the pan wall to break the blocks loose from the grid and the pan.

21. In a freezing apparatus of the type including a pan adapted to receive a substance to be frozen and a grid within the pan for dividing the interior thereof into a plurality of ice block molds, the method of releasing frozen blocks from the pan which consists in, moving the grid upwardly relative to the pan and simultaneously moving the grid toward a side wall of said pan to substantially compress the blocks between the grid and the pan wall to break the blocks loose from the grid and the pan.

22. In a freezing apparatus for liquids, in combination, a tray, a grid within said tray forming a plurality of ice block molds, and force-multiplying means within said tray reacting upon the bottom wall of said tray and manually actuatable to urge the frozen ice blocks upwardly from said bottom wall.

23. In a freezing apparatus for liquids, in combination, a tray, a grid within said tray forming a plurality of ice block molds, a force-multiplying means within said tray reacting upon the bottom wall of said tray and manually actuatable to urge said grid upwardly from said bottom wall to facilitate the removal of the frozen ice blocks from said tray.

24. In a freezing apparatus for liquids, in combination, a tray, a grid within said tray forming a plurality of ice block molds, and force-multiplying means within said tray reacting upon the inside portion of the bottom wall of said tray and manually actuatable to urge at least some of the frozen ice blocks upwardly relative to said tray.

25. In a freezing apparatus for liquids; in combination, a freezing tray having a bottom wall, a removable grid within said tray, and force-multiplying means reacting upon said bottom wall and having a portion extending upwardly thru the frozen contents and projecting above the normal water level in said tray and manually actuatable to loosen said bottom wall from the frozen contents in said tray.

26. In a freezing apparatus for liquids, in combination, a freezing tray having a bottom wall, a removable grid within said tray, and force-multiplying means engaging said bottom wall and having a rotatable actuating shank extending upwardly thru the frozen contents and projecting thereabove, said actuating shank being rotatable to cause a separating force between said bottom wall and said grid.

27. In a freezing apparatus for liquids, in combination, a freezing tray, and a removable flexible partitioning grid in said tray, one of the partitioning walls of said grid comprising two flexible metal sheets normally disposed with their faces in substantial contact, said sheets being fixed together at an edge portion thereof in such manner as to permit a slight relative movement between said sheets by flexure thereof to facilitate loosening of the frozen ice blocks therefrom.

28. In a freezing apparatus for liquids, in combination, a freezing tray, and a removable flexible partitioning grid in said tray, one of the partitioning walls of said grid comprising two flexible metal sheets normally disposed with their faces in susbtantial contact, said sheets being permanently fixed together only at the edge portion or portions thereof and leaving the major normally contacting areas of said sheets free and capable of relative movement by distortion to facilitate loosening of the frozen ice blocks therefrom.

29. In a freezing apparatus for freezing liquids, in combination, a freezing tray, a removable flexible metal grid in said tray, said grid having double partitioning walls each comprising two flexible metal sheets normally held in face to face contact and being relatively separatable over the major portions of their normally contacting areas by flexure of said sheets whereby to loosen the frozen bond of the contacting ice blocks.

30. In a freezing apparatus for liquids, in combination, a freezing tray, and a removable flexible partitioning grid in said tray, one of the partitioning walls of said grid comprising two flexible metal sheets normally disposed with their faces in substantial contact, said sheets being fixed together at an edge portion thereof in such manner as to permit a slight relative movement between said sheets by flexure thereof, and means for causing a slight relative movement between said sheets to facilitate loosening of the ice blocks therefrom.

BERTRAM B. GEYER.